Figure 1:
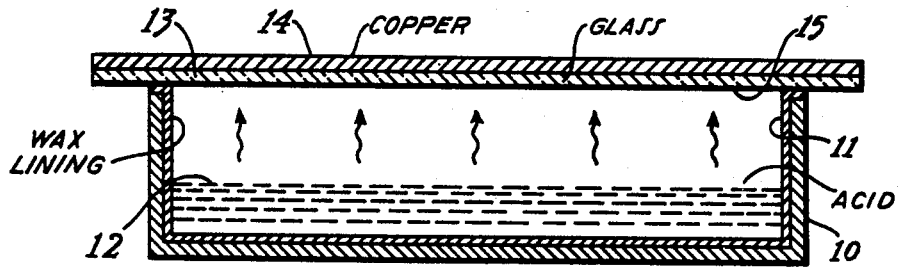

Feb. 11, 1947.   F. H. NICOLL   2,415,703
LOW REFLECTION GLASS
Filed April 26, 1944

INVENTOR.
Frederick H. Nicoll
BY
ATTORNEY

Patented Feb. 11, 1947

2,415,703

UNITED STATES PATENT OFFICE 2,415,703

LOW REFLECTION GLASS

Frederick H. Nicoll, Princeton, N. J., assignor to Radio Corporation of America, a corporation of Delaware Application April 26, 1944, Serial No. 532,715

7 Claims. (Cl. 41—42)

This invention relates to improved glass exhibiting low reflection and to a method of producing such glass.

In three copending applications, particulars of which are set forth below and each of which has been assigned to the same assignee as the instant application, there have been disclosed methods of treating glass surfaces with dilute hydrofluoric acid gas or with other substances including such a gas, whereby surface layers of the glass are skeletonized, and as a consequence of which the reflection of light from such surfaces is substantially reduced. Particulars of said applications are as follows:

| Ser. No. | Filing date | Inventor | Title of invention |
|---|---|---|---|
| 461,958 | Oct. 14, 1942 | F. H. Nicoll | Optical element. |
| 488,938 | May 28, 1943 | F. H. Nicoll and F. E. Williams. | Low reflective element. |
| 495,612 | July 21, 1943 | F. H. Nicoll | Non-reflective films. |

Glass treated as described in these applications is extremely efficient. Under appropriate conditions, reflection may be reduced by as much as 95 per cent as compared with untreated glass; and glass so treated possesses other advantages not obtained by the methods of the prior art. The necessity, however, of preventing dirt and other extraneous substances from becoming lodged in the cavities, caused by the skeletonization before-mentioned, is a complication which it is desirable to avoid. This condition is most noticeable in glass one surface of which is exposed to dirt, while the other surface is comparatively protected; for example, in glass used to cover the dial of an instrument or as the outer lens of an optical device. Finger prints can be readily seen on a treated surface and, if not wiped off promptly, become extremely difficult to remove. For example, when a finger print is left on a treated surface for twenty-four hours, it is found impossible to remove it by wiping with a cloth and very difficult to do so by the use of soap and water. Acid cleansing solutions are also impractical for this purpose.

An object of the invention is to provide glass having a low reflection surface from which finger prints and dirt may be readily removed.

Another object of the invention is to provide glass having a low reflection surface on which finger prints will not be easily visible.

A further object of the invention is to provide glass having a low reflection surface and which is harder and resists abrasion better than glass treated by other methods.

In the processes described in the before-mentioned copending applications, the surface to be treated is exposed to the action of dilute hydrofluoric acid gas in one of a number of ways. During the treatment, the surface produces a succession of interference colors which are visible in reflected light. These colors are, in turn, light brown, brown, dark brown, reddish purple, purple, bluish purple, dark blue, blue, light blue, and finally a greenish blue. As the treatment proceeds, a white deposit believed to consist mostly of fluosilicates is formed on the treated surface. The treatment may be terminated when the treated surface produces a purple interference color in reflected light, because then the effective optical thickness of the treated surface layer is approximately a quarter of the wave length of green light (the midpoint of the visible spectrum), and reflection of such light from the surface will be at a minimum. As is well known, and as discussed more fully in the copending application Serial No. 461,958 referred to above, the thickness of the film may be any odd number of quarter wavelengths of the incident light, and the treatment may be carried on until a second series of colors is observed. At the termination of the treatment, the white deposit is in a soluble condition and should be washed off, because if allowed to remain it hardens and becomes difficult to remove. Removal of the white deposit leaves a skeletonized or porous surface layer containing numerous sub-microscopic cavities. The index of refraction of the layer may then be as low as 1.28. One indication of the presence of these cavities lies in the fact that the layer absorbs light oils.

In the course of investigations, it became apparent that the reason why finger marks left on a treated surface became difficult to remove was that moisture derived from the fingers became absorbed in these cavities, so that wiping with a cloth or washing with soap was not effective because it did not reach into such cavities.

First attempts to deal with this problem lay in the direction of filling the cavities, and the white fluosilicate deposit suggested itself as a conveniently available material for the purpose, particularly because on hardening it became insoluble in water or acid and enabled the treated surface to be readily cleaned. The deposit, however, produced a clouding or fogging of the treated surface, which was very undesirable. Filling the cavities with wax was not more successful because on cleaning the surface after application of the wax, it tended to smear at least as badly as the finger prints. Moreover, the index of refraction of most waxes lies between 1.45 and 1.47, and the treatment increased reflection unduly from the treated surface.

Other attempts to deal with the problem lay in an entirely different direction; namely, by overtreating the glass until it produced a light blue instead of a purple interference color, but the results obtained were also unsatisfactory.

However, if one surface of the glass is treated until the index of refraction of the treated layer is equal to that of moisture derived from the fingers or hand, numerous beneficial results ensue. Such moisture consists mainly of water, having an index of approximately 1.33, and of salts derived from the human body, such salts having an index of between 1.34 and 1.37. The index of the finger marks may, therefore, be between 1.33 and 1.37, that is, of the order of 1.35. Untreated glass has an index in general of over 1.5 (depending on the kind of glass to be treated), and full treatment of a surface as before described until a purple interference color is observed in reflected light results in a surface layer which may have an index as low as 1.28.

However, if a surface is treated until a light brown interference color is first observed in reflected light, the reflection of light from the surface is approximately half of what it would be from an untreated surface, and the index of the treated surface layer is approximately equal to that of finger marks imprinted on the surface, that is, between the values of 1.33 to 1.37 approximately. The contrast, therefore, between such marks and the layer is so small as to make the marks almost completely invisible. Moreover, even if the marks are left on the surface for a considerable period of time (for example, several hours) they are not absorbed as they would be into a fully treated surface layer. This would appear to indicate that the degree of skeletonization is slight as compared with a fully treated surface layer, and is borne out by the fact that little difference in friction may be observed when a half-treated and an untreated surface are rubbed with a cloth. The half-treated surface, because it is smoother than a fully treated one, may be readily and easily cleaned and has numerous other advantages. A surface treated as here taught is almost as hard as an untreated surface, because the treated layer is not as deep as fully treated glass, and the layer therefore has more solid backing. It does not, therefore, scratch easily and when it does do so, the scratches are hardly noticeable.

The invention finds particular application with glass one surface of which is exposed to dirt and finger marks, while the other is comparatively protected; for example, as previously stated, glass used to cover the dial of an instrument. Glass which has been fully treated on both sides until a purple interference color is observed will reflect from 5 to 15 per cent of the light reflected by untreated glass, but finger marks and dirt will be easily observed on and absorbed by the exposed surface, and it will be difficult to remove them. Glass fully treated on the inner surface only and not treated on the outer surface will reflect from 55 to 65 per cent of the light reflected by completely untreated glass, and the reduction in reflection will not be particularly noticeable. On the other hand, glass fully treated on the inner surface until a purple interference color is observed and treated on the outer surface only until a light brown interference color is observed reflects only 25 to 35 per cent of the light reflected by completely untreated glass, and the reduction in reflection is readily noticed. Moreover, glass so treated shows no appreciable color, while glass fully treated on both surfaces has a color which may, in certain circumstances, be objectionable.

Figure 2:
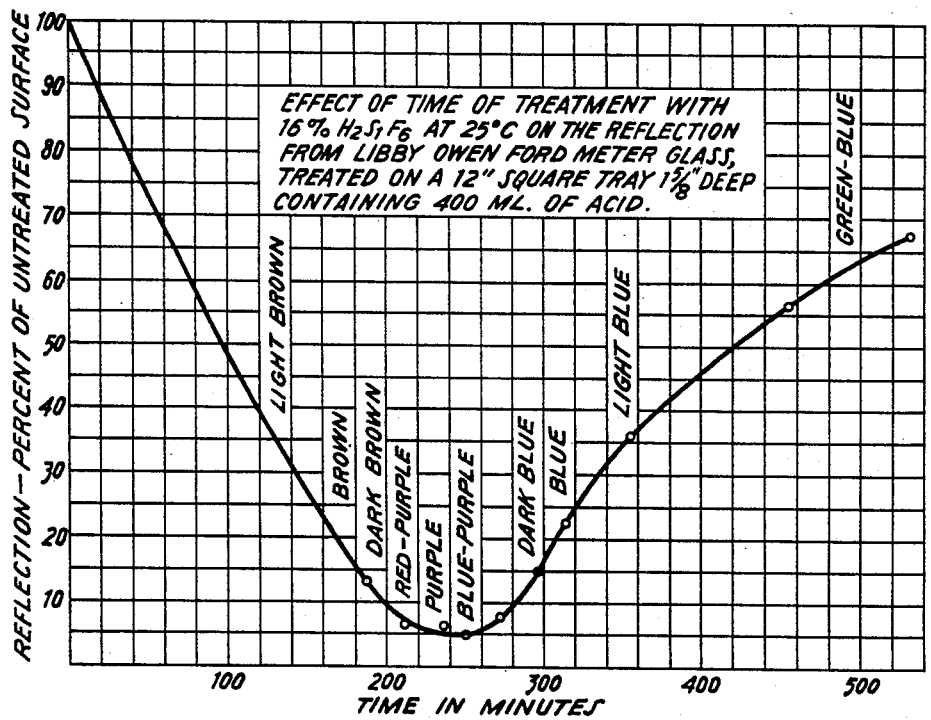

In the accompanying drawing:

Figure 1 is a view in section of apparatus which may be used in carrying the invention into effect, and Figure 2 is a graph showing the interference colors produced by a treated surface in reflected light and the reduction in reflection of light from the surface as a function of the time of treatment.

Referring to Figure 1, a copper tray 10 which may be twelve inches square and 1⅝ inches deep is provided with a wax lining 11 and contains a 16 per cent solution of fluosilicic acid $H_2SiF_6$, designated by the reference numeral 12, to a depth of approximately ⅛ inches. A sheet 13 of glass to be treated is placed over the top of the tray, preferably with an air-tight seal around the edges. The surface 15 is be treated faces downwardly and is thus exposed to the vapor arising from the acid solution. A copper plate 14 is placed over the glass and serves to maintain the glass at the same temperature as the acid.

The fluosilicic acid is unstable and dissociates into hydrofluoric acid and silicon tetrafluoride ($H_2SiF_6 \rightarrow 2HF + SiF_4$). The reaction between these substances and the glass is not fully understood, but it is known that the soluble white deposit before referred to and containing fluosilicates is formed, and that when this is washed off a hard skeletonized surface layer remains.

Figure 2 shows the course of the various interference colors produced and the reduction in reflection which takes place at the time of treatment increases. In practicing the present invention, the treatment should be terminated when the treated surface layer produces a light brown interference color visible in reflected light. This will be somewhat more than two hours after the commencement of the treatment under the conditions maintained in taking the data on which Figure 2 is based, or approximately half the time required for the full treatment taught, for example, by application No. 488,938.

The fluosilicate deposit may alter the interference colors, and the layer appear to be a darker brown than called for by Figure 2; but on removal of the deposit by washing, the light brown interference color will be observed.

Any one of the processes described in the before-mentioned copending applications may be employed in practicing the present invention, as well as any other controllable process which results in the skeletonization of a surface layer of glass and reduction of its index of refraction by a desired amount.

There has thus been described a process for treating glass to reduce reflection from a surface thereof. Finger marks and dirt are almost invisible on a surface so treated, and they will not be absorbed thereinto and can be readily removed therefrom. A surface so treated will be hard and smooth, and have a low coefficient of friction. When a surface of glass exposed to dirt and finger marks is treated as here taught, while an opposing surface is treated to reduce its reflection to a minimum, the total reduction in reflection will be substantial and appreciable, in addition to the advantages already cited, and the treated surface will exhibit little color.

I claim as my invention:

1. Glass having at least two layers structurally integral with said glass and immediately adjacent different surfaces thereof, one of said layers being skeletonized by the removal of siliceous and non-siliceous ingredients therefrom and having an effective optical thickness of the order of a quarter of the wavelength of a component of light, and the other of said layers being partially so skeletonized and having an index of refraction of the order of 1.33 to 1.37 so as to equal approximately that of moisture derived from the human hand.

2. A transparent element exhibiting properties of high light transmission and low light reflection, comprising glass, one surface having a porous skeletonized layer integral therewith, the effective thickness being substantially a quarter wavelength of the incident light and the index of refraction being substantially equal to the square root of that of the untreated glass, and the other surfaces being partially skeletonized to produce an index of refraction lying between the values of 1.33 and 1.37.

3. A transparent element exhibiting properties of high light transmission and low light reflection, and normally having one surface protected from and the other surfaces exposed to dirt and other foreign matter destructive of said properties comprising glass, the protected surface having a porous skeletonized layer integral therewith, the thickness being substantially a quarter wavelength of the incident light and the index of refraction being substantially equal to the square root of that of the untreated glass and the exposed surface being partially skeletonized and having an index of refraction between the values of 1.33 and 1.37.

4. A transparent element exhibiting properties of high light transmission and low light reflection comprising glass, one surface of said glass having a porous skeletonized surface layer, the effective thickness of said layer being an odd number of quarter wavelengths of the incident light, and the other surface being partially skeletonized and having an index of refraction lying between the value of 1.33 and 1.37.

5. A transparent element exhibiting properties of high light transmission and low light reflection comprising glass, one surface of said glass having a porous skeletonized surface layer, the effective thickness of said layer being an odd multiple of quarter wavelengths of the incident light and the index of refraction being substantially equal to the square root of that of the untreated glass, and the other surface being partially skeletonized and having an index of refraction lying between the values of 1.33 and 1.37.

6. A transparent element exhibiting properties of high light transmission and low light reflection comprising glass, one surface of said glass having an integral porous skeletonized surface layer of silica, and the other surface being partially skeletonized and having an index of refraction of the order of 1.35.

7. A transparent element exhibiting properties of high light transmission and low light reflection comprising glass, one surface of said glass having an integral porous skeletonized layer of silica, and having an index of refraction substantially equal to the square root of the index of the untreated glass; and the other surface having an integral partially skeletonized layer of silica an odd integral multiple of a quarter wavelength of light in thickness and having an index of refraction of the order of 1.35.

FREDERICK H. NICOLL.

REFERENCES CITED

The following references are of record in the file of this patent:

UNITED STATES PATENTS

| Number | Name | Date |
|---|---|---|
| 2,220,862 | Blodgett | Nov. 5, 1940 |
| 2,207,656 | Cartwright et al. | July 9, 1940 |
| 2,282,677 | Rayton | May 12, 1942 |
| 1,787,460 | Bausch | Jan. 6, 1931 |
| 2,259,395 | Sachtleben | Oct. 14, 1941 |
| 1,980,021 | Wetherbee | Nov. 6, 1934 |
| 2,369,741 | Jones et al. | Feb. 20, 1945 |

FOREIGN PATENTS

| Number | Country | Date |
|---|---|---|
| 29,561 | British | 1904 |
| 2,337,460 | French | Dec. 21, 1943 |

OTHER REFERENCES

Nicoll: in International Projectionist, July 1942, pages 9–11. (Photostatic copy in 88/1 R & R.)

Blodgett: Phy. Rev., vol. 55, #4, Feb. 1939, pages 397, 399, 401. (Photostatic copy in Division 7.)

Mellor: Treatise of Organic & Theoretical Chem., vol. VI, 1925, Pub. Longmans, Green & Co., New York, p. 943. (Copy in Div. 59.)